US009529781B2

(12) United States Patent
Xing et al.

(10) Patent No.: US 9,529,781 B2
(45) Date of Patent: Dec. 27, 2016

(54) APPARATUS AND METHOD FOR DOCUMENT FORMAT CONVERSION

(71) Applicants: Peking University Founder Group Co., Ltd., Beijing (CN); Founder Apabi Technology Limited, Beijing (CN); Founder Information Industry Holdings Co., Ltd., Beijing (CN)

(72) Inventors: Guofeng Xing, Beijing (CN); Changsheng Wang, Beijing (CN)

(73) Assignees: PEKING UNIVERSITY FOUNDER GROUP CO., LTD., Beijing (CN); FOUNDER APABI TECHNOLOGY LIMITED, Beijing (CN); FOUNDER INFORMATION INDUSTRY HOLDINGS CO., LTD., Beijing (CN)

( * ) Notice: Subject to any disclaimer, the term of this patent is extended or adjusted under 35 U.S.C. 154(b) by 0 days.

(21) Appl. No.: 14/399,337

(22) PCT Filed: Nov. 4, 2013

(86) PCT No.: PCT/CN2013/086494
§ 371 (c)(1),
(2) Date: Nov. 6, 2014

(87) PCT Pub. No.: WO2015/010386
PCT Pub. Date: Jan. 29, 2015

(65) Prior Publication Data
US 2015/0339271 A1   Nov. 26, 2015

(30) Foreign Application Priority Data
Jul. 22, 2013   (CN) .......................... 2013 1 0309016

(51) Int. Cl.
*G06F 17/00* (2006.01)
*G06F 17/21* (2006.01)
(Continued)

(52) U.S. Cl.
CPC .......... *G06F 17/212* (2013.01); *G06F 17/214* (2013.01); *G06F 17/22* (2013.01); *G06F 17/24* (2013.01);
(Continued)

(58) Field of Classification Search
CPC ......................... G06F 17/214; G06F 17/2217
See application file for complete search history.

(56) References Cited

U.S. PATENT DOCUMENTS 5,859,648 A * 1/1999 Moore .................. G06F 17/214
345/471
6,678,410 B1 * 1/2004 Phinney ................. G06K 15/02
345/171
(Continued)

FOREIGN PATENT DOCUMENTS

CN       102866986 A    1/2013
CN       103186513 A    7/2013

OTHER PUBLICATIONS

Addison, "Web Site Cookbook" published Feb. 10, 2006, p. 1-8.*
International Search Report (Untranslated) of PCT/CN2013/086494, Mailed on Jul. 22, 2013, 4 pages.

*Primary Examiner* — Amelia Tapp
(74) *Attorney, Agent, or Firm* — Brinks Gilson & Lione (57) ABSTRACT

An apparatus and method for document format conversion. The apparatus includes a document parsing unit for parsing a fixed layout document to acquire path primitives of the document; a path grouping unit for dividing the path primitives into groups to generate path groups; a font file generating unit for acquiring path groups that are used to represent characters and generating font files corresponding to the path groups, wherein if there are two or more path groups representing the same character, only one font file is generated and associated with the multiple path groups representing the same character; a document generating unit for
(Continued)

generating a converted document using all font files that have been generated. With the above, the problem of data redundancy in fixed layout documents is solved; further, the incorrect rending in reflowing processes may be solved to achieve better display effects.

18 Claims, 8 Drawing Sheets

(51) Int. Cl.
  *G06F 17/30* (2006.01)
  *G06F 17/24* (2006.01)
  *G06F 17/22* (2006.01)
  *G06K 9/00* (2006.01)
(52) U.S. Cl.
  CPC ... *G06F 17/30011* (2013.01); *G06F 17/30339* (2013.01); *G06K 9/00* (2013.01)

(56) References Cited

U.S. PATENT DOCUMENTS

| | | | |
|---|---|---|---|
| 6,954,898 B1* | 10/2005 | Nakai | G06F 17/214 715/262 |
| 7,165,216 B2* | 1/2007 | Chidlovskii | G06F 17/30914 707/999.1 |
| 7,310,769 B1* | 12/2007 | Dash | G06F 17/2217 715/269 |
| 7,315,868 B1 | 1/2008 | Turba | |
| 7,574,050 B2* | 8/2009 | Ladwig | G06K 9/74 382/209 |
| 8,266,179 B2* | 9/2012 | Forman | G06F 17/277 707/791 |
| 8,768,061 B2* | 7/2014 | Meunier | G06K 9/6828 382/182 |
| 2005/0105799 A1* | 5/2005 | Strohecker | G06F 3/04883 382/186 |

* cited by examiner

APPARATUS AND METHOD FOR DOCUMENT FORMAT CONVERSION

FIELD OF THE INVENTION

The present invention relates to the field of electronic document format conversion techniques, and more particular, to an apparatus and a method for document format conversion.

DESCRIPTION OF THE RELATED ART

In fixed layout documents, many paths (including points and lines) are used to represent characters, each character corresponding to a set of data. Thereby, a problem may arise, i.e., a large amount of paths are required to represent a large amount of duplicated characters, causing data redundancy significantly. Further, it may be unable to render these characters appropriately in a reflowing process.

Thus, a new document format conversion technique is desirable, which is capable of solving the problem of data redundancy in fixed layout documents to cause documents with smaller volumes, and is capable of solving the problem of incorrect rendering in reflowing processes to achieve better display effects on various terminals.

SUMMARY

In view of the above problems, a new document format conversion technique is provided, which is capable of solving the problem of data redundancy in fixed layout documents to cause documents with smaller volumes, and is capable of solving the problem of incorrect rendering in reflowing processes to achieve better display effects on various terminals.

In view of this, an apparatus for document format conversion is provided in the present invention, comprising: a document parsing unit for parsing a fixed layout document to acquire path primitives of the fixed layout document; a path grouping unit for dividing the path primitives into groups to generate path groups; a font file generating unit for acquiring path groups representing characters and generating font files corresponding to the path groups representing the characters, wherein if there are two or more path groups representing the same character, only one font file is generated, and is associated with the two or more path groups representing the same character; a document generating unit, for generating a converted document using all font files that have been generated. In this technical solution, through dividing path primitives of the fixed layout document into groups, a path group corresponding to each character is obtained (also, there may be path groups that are not used to representing characters); meanwhile, due to the generation of font files and only one font file is generated for those path groups that are used to represent the same character, for those documents having many duplicated characters contained therein, their volumes may be reduced greatly, which is beneficial to store more documents, particularly in the case of mobile devices.

A method for document format conversion is further provided, comprising: parsing a fixed layout document to acquire path primitives of the fixed layout document; dividing the path primitives into groups to generate path groups; acquiring path groups representing characters and generating font files corresponding to the path groups representing the characters, wherein if there are two or more path groups representing the same character, only one font file is generated, and is associated with the two or more path groups representing the same character; generating a converted document using all font files that have been generated. In this technical solution, through dividing path primitives of the fixed layout document into groups, a path group corresponding to each character is obtained (also, there may be path groups that are not used to representing characters); meanwhile, due to the generation of font files and only one font file is generated for those path groups that are used to represent the same character, for those documents having many duplicated characters contained therein, their volumes may be reduced greatly, which is beneficial to store more documents, particularly in the case of mobile devices.

With the above technical solutions, the problem of data redundancy in fixed layout documents may be solved, causing documents with smaller volumes; further, the problem of incorrect rendering in reflowing processes may be solved to achieve better display effects on various terminals.

DESCRIPTION OF THE EMBODIMENTS

For a more distinct understanding of the above objects, features and advantageous of this invention, it will be described in a further detail with reference to drawings and particular embodiments below. It should be noticed that, in the case of no conflicts, embodiments and features of embodiments of this invention may be combined with each other.

Many details will be set forth in the following description to achieve a throughout understanding of this invention, however, this invention may be implemented in other ways different from that disclosed herein, and therefore is not limited to the particular embodiments disclosed below.

Figure 1A:
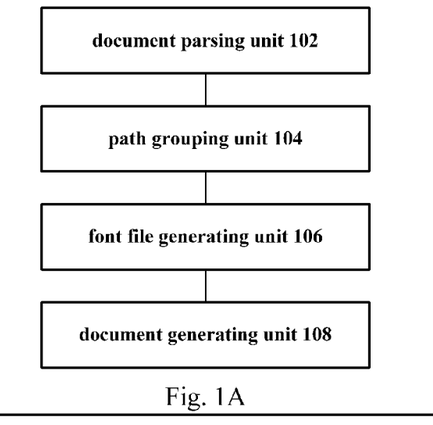
FIG. 1A shows a block diagram of an apparatus for document format conversion according to an embodiment of this invention.

FIG. 1 shows a block diagram of an apparatus for document format conversion according to an embodiment of this invention. As shown in FIG. 1A, the apparatus for document format conversion comprises a document parsing unit 102 for parsing a fixed layout document to acquire path primitives of the fixed layout document; a path grouping unit 104 for dividing the path primitives into groups to generate path groups; a font file generating unit 106 for acquiring path groups representing characters and generating font files corresponding to the path groups representing the characters, wherein if there are two or more path groups representing the same character, only one font file is generated, and is associated with the two or more path groups representing the same character; a document generating unit 108 for generating a converted document using all font files that have been generated.

Figure 1B:
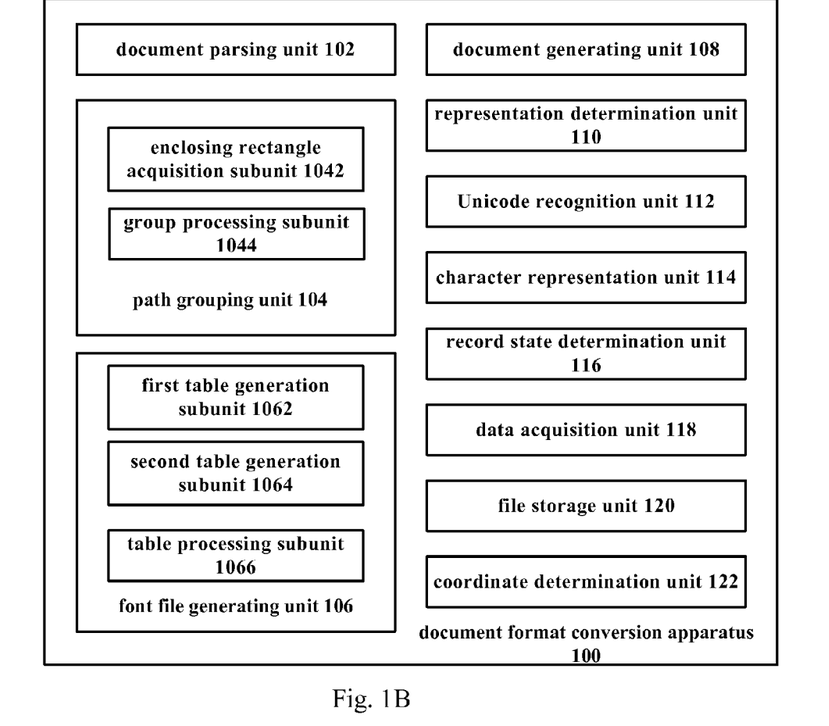
FIG. 1B shows a block diagram of an apparatus for document format conversion according to another embodiment of this invention.

FIG. 1B shows a block diagram of an apparatus for document format conversion according to an embodiment of this invention.

As shown in FIG. 1B, the apparatus 100 for document format conversion according to the embodiment of the present invention comprises: a document parsing unit 102 for parsing a fixed layout document to acquire path primitives of the fixed layout document; a path grouping unit 104 for dividing the path primitives into groups to generate path groups (including path groups to be obtained by the font file generating unit 106 for representing characters, and other path groups that are not used to represent characters); a font file generating unit 106 for acquiring path groups representing characters and generating font files corresponding to the path groups representing the characters, wherein if there are two or more path groups representing the same character, only one font file is generated, and is associated with the two or more path groups representing the same character; a document generating unit 108 for generating a converted document using all font files that have been generated. In this technical solution, through dividing path primitives of the fixed layout document into groups, a path group corresponding to each character is obtained (also, there may be path groups that are not used to representing characters); meanwhile, due to the generation of font files and only one font file is generated for those path groups that are used to represent the same character, for those documents having many duplicated characters contained therein, their volumes may be reduced greatly, which is beneficial to store more documents, particularly in the case of mobile devices.

Specifically, in a fixed layout document for example, each character is represented by individual paths, so that, even for duplicated characters occurred repeatedly, they must be represented by separate paths, causing significant redundancy in a large amount of paths, and resulting to a large document volume accordingly. However, through generating font files, duplicated characters may be represented by only one font file, greatly reducing original path redundancy, which is thus beneficial to achieve reduced document volumes and solve the problem of document data redundancy.

In the above technical solution, preferably, the path grouping unit 104 comprises: an enclosing rectangle acquisition subunit 1042 for acquiring a minimum closing rectangle of each path primitive; a group processing subunit 1044 for detecting position relationships between the minimum enclosing rectangles of the various path primitives; in the case of intersected minimum enclosing rectangles of two path primitives or in the case of a distance between minimum enclosing rectangles of two path primitives that is less than a predetermined character spacing, dividing the two path primitives into the same path group. In other words, if a minimum enclosing rectangle corresponding to a path primitive intersects with a minimum enclosing rectangle corresponding to another path primitive, or if the distance between two path primitives is less than a predetermined character spacing, the path primitive and the other path primitive are divided into the same path group. In this solution, for each path primitive, its minimum enclosing rectangle is considered as an area corresponding to the path primitive, and through an interaction calculation or through a distance calculation performed on rectangular areas, it may be determined whether a path primitive will be divided into the same path group with other path primitives. Actually, each character corresponds to a path group (also, there may be other path groups that are not used to represent characters), and the division of each character of a fixed layout document may be achieved through the grouping process described above.

In the above solution, preferably, further comprises: a representation determination unit 110 for recognizing each path group through an Optical Character Recognition (OCR) technique. If a character corresponding to a path group is recognized, it is determined that the corresponding path group is used to represent the character, for the processing of the font file generation unit. In this solution, if a path group is used to represent a character, it may be recognized through an OCR technique, so that whether a path group is used to represent a character may be determined.

In the above technical solution, preferably, further comprises: a Unicode recognition unit 112 for recognizing a Unicode value corresponding to a path group that is used to represent a character; a character representation unit 114 for representing the character to be described with the recognized Unicode value and a corresponding font file. In this technical solution, a font file comprises path data for describing a character to facilitate proper document content reflowing on different devices and achieve better display effects. Through setting Unicode values, when a character of a document is selected by a user, the system may select a corresponding Unicode value to achieve character copy and the like.

In the above technical solution, preferably, the font file generation unit 106 generates the font file using the Unicode value recognized by the Unicode recognition unit 112 and a corresponding path group. In this technical solution, the font file is generated from the Unicode value and the path group, so as to guarantee the appropriate representation of the corresponding character.

In the above technical solution, preferably, the font file generation unit 106 comprises: a first table generation subunit 1062 for generating a first table using Unicode values, in which mappings between the Unicode values and font indexes are stored; a second table generation subunit 1064 for generating a second table using path primitives contained in the path groups, in which the font indexes and font data corresponding to the font indexes are stored; a table processing subunit 1066 for generating the font file using the first table and the second table. In this technical solution, the first table is a cmap table generated using Unicode values, and the second table is a glyf table that is generated using path groups.

In the above technical solution, preferably, further comprises: a record state determination unit 116 for determining whether a Unicode value recognized by the Unicode recognition unit 112 has been recorded; a data acquisition unit 118 for, if the Unicode value has been recorded, determining that there is a path group representing the same character and acquiring the recorded Unicode value and its corresponding font file that has been generated, for representing the character to be described by the character representation unit 114; and if the Unicode value has not been recorded, generating a font file for representing the character to be described by the character representation unit 114. In this technical solution, through comparing the recognized Unicode value, it is determined whether a character that is presently processed has been handled, that is, whether there is the same character existed; if so, a font file that has been generated previously and other information may be directly used to avoid data redundancy; otherwise, a font file is generated. From the above comparison, it may be guaranteed that only one font file is generated from each character, so that data redundancy may be avoided so as so as to reduce the volume of the document.

In the above technical solution, preferable, further comprises a file storage unit 120 for centrally storing the font files, so that the character representation unit 114 may represent a corresponding character using the name of a font file and a Unicode value corresponding to the Unicode file; and a coordinate determination unit 122 for, if an acquired Unicode value of a specified path group has been recorded previously, further acquiring coordinates of the specified path group, and determining whether the coordinates of the specified path group are identical to those of the recorded path group; wherein if identical, a determination of the same path group is made and no further process is required; otherwise, a new name is generated for the character representation unit 114 to represent a corresponding character using the recorded Unicode value and the new name and for the font file generating unit 106 to generate a font file named with the new name. In this technical solution, through coordinate determination, for a character represented by a path group that is presently processed, it is determined whether there is any other path group representing the same character, so as to guarantee that only one font file and other information is generated for the same character so as to reduce the volume of the document as much as possible and avoid redundancy.

Figure 1C:
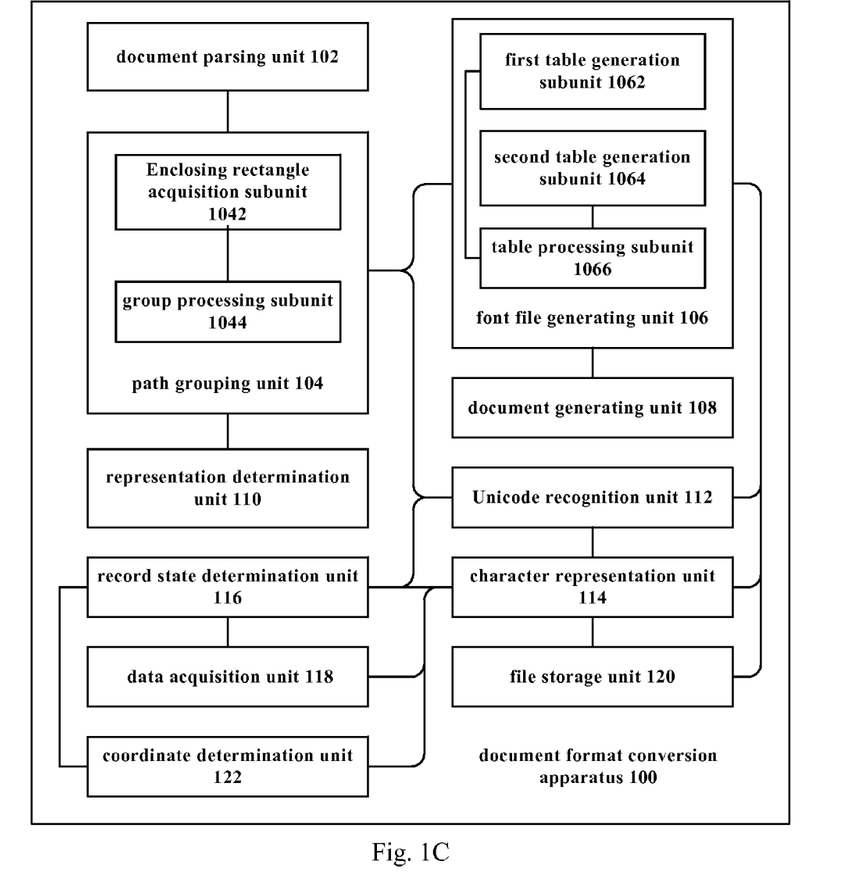
FIG. 1C is a schematic diagram showing relationships between various units of the apparatus for document format conversion shown in FIG. 1B.

FIG. 1C is a schematic diagram showing relationships between various units of the apparatus for document format conversion shown in FIG. 1B.

As shown in FIG. 1C, various units of the apparatus 100 for document format conversion have the following relationships therebetween.

The document parsing unit 102 is connected to the path grouping unit 104. Particularly, the path grouping unit 104 divides path primitives into groups to generate corresponding path groups according to path primitives obtained through the parsing of the document parsing unit 102.

Particularly, the path grouping unit 104 comprises an enclosing rectangle acquisition subunit 1042 and a group processing subunit 1044. Wherein the enclosing rectangle acquisition subunit 1042 is connected to the document parsing unit 102 and acquire a minimum enclosing rectangle for each path primitive based on the path primitives obtained through the parsing of the document parsing unit 102; the group processing subunit 1044 is connected to the enclosing rectangle acquisition subunit 1042 to detect position relationships between the minimum enclosing rectangles of the various path primitives; and divide the path primitives into groups according to the relationships between the minimum enclosing rectangles.

The font file generating unit 106 is connected to the path grouping unit 104 and the document generating unit 108 respectively. Particularly, based on path groups that are used to represent characters among the path groups generated by the path grouping unit 104, the font file generating unit 106 generates font files, and the document generating unit 108 generates a converted document using the font files.

The representation determination unit 110 is connected to the font file generating unit 106, and determines whether a path group is used to represent a character through recognizing the path group, so that the font file generating unit 106 may generate font files from path groups that are used to represent characters.

The Unicode recognition unit 112 is connected to the representation determination unit 110 and recognizes a corresponding Unicode value for each path group representing a character as determined by the representation determination unit 110.

The Unicode recognition unit 112 is further connected to the font file generating unit 106 to enable the font file generating unit 106 to generate font files using the Unicode values recognized by the Unicode recognition unit 112 and corresponding path groups generated by the path grouping unit 104.

Particularly, the font file generating unit 106 comprises a first table generation subunit 1062, a second table generation subunit 1064 and a table processing subunit 1066. Wherein, the first table generation subunit 1062 is connected to the Unicode recognition unit 112 and generates a first table using the Unicode values recognized by the Unicode recognition unit 112; the second table generation subunit 1064 is connected to the path grouping unit 104 and generates a second table using path primitives contained in the path groups; the table processing subunit 1066 is connected to the first table generation subunit 1062 and the second table generation subunit 1064 respectively to generate font files using the first table and the second table.

The character representation unit 114 is connected to the Unicode recognition unit 112 and the font file generating unit 106 to represent characters to be represented using the Unicode values recognized by the Unicode recognition unit 112 and the corresponding font files generated by the font file generating unit 106.

The record state determination unit 116 is connected to the Unicode recognition unit 112 and the data acquisition unit 118 respectively. Particularly, the record state determination unit 116 determines whether a Unicode value recognized by the Unicode recognition unit 112 has been recorded previously, and if so, the data acquisition unit 118 determines that there is another path group representing the same character and acquire the recorded Unicode value and a font file that has been generated correspondingly for the character representation unit 114 to represent the character to be described (the data acquisition unit 118 is further connected to the character representation unit 114).

The file storage unit 120 is connected to the font file generating unit 106 and the character representation unit 114 respectively. Particularly, the file storage unit 120 centrally stores font files generated by the font file generating unit 106, so that the character representation unit 114 may represent corresponding characters using names of the font files and Unicode values corresponding to the font files.

The coordinate determination unit 122 is connected to the record state determination unit 116 and the character representation unit 114 respectively. Particularly, if the record state determination unit 116 determines that an acquired Unicode value of a specified path group has been recorded, the coordinate determination unit 122 further acquires coordinates of the specified path group, and determines whether the coordinates of the specified path group are identical to those of the recorded path group; if not identical, a new name is generated, so that the character representation unit 114 may represent a corresponding character using the recorded Unicode value and the new name, and the font file generating unit 106 generates a font file named by the new name.

Figure 2:
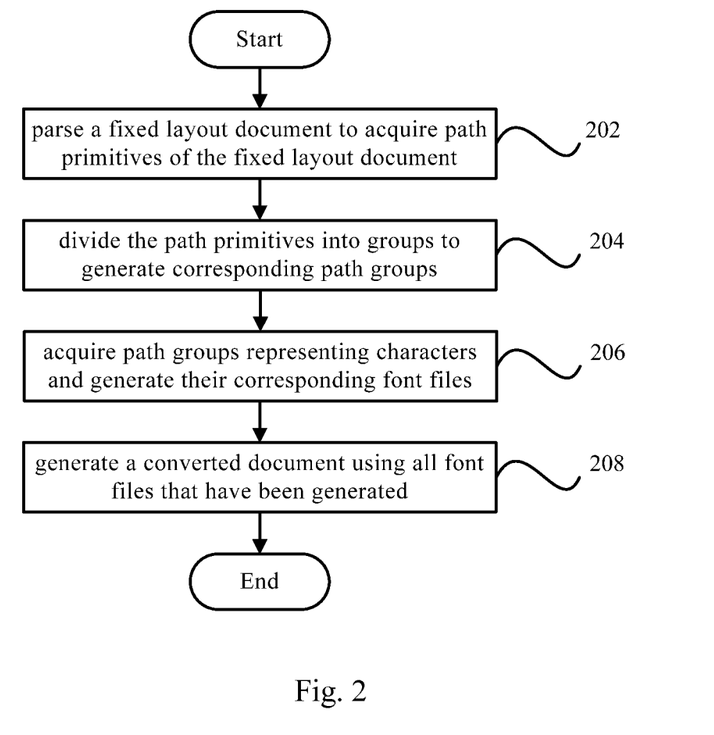
FIG. 2 shows a flowchart of a method for document format conversion according to an embodiment of this invention.

FIG. 2 shows a flowchart of a method for document format conversion according to an embodiment of this invention.

As shown in FIG. 2, the method for document format conversion according to the embodiment of this invention comprises: at step 202, parsing a fixed layout document to acquire path primitives of the fixed layout document; at step 204, dividing the path primitives into groups to generate various path groups (including path groups representing characters that are acquired at step 206 and other path groups that are not used to represent characters); at step 206, acquiring path groups representing characters and generating their corresponding font files, wherein if there are two or more path groups representing the same character, only one font file is generated, and is associated with the two or more path groups representing the same character; at step 208, generating a converted document using all font files that have been generated. In this technical solution, through dividing path primitives of the fixed layout document into groups, a path group corresponding to each character is obtained (also, there may be path groups that are not used to representing characters); meanwhile, due to the generation of font files and only one font file is generated for those path groups that are used to represent the same character, for those documents having many duplicated characters contained therein, their volumes may be reduced greatly, which is beneficial to store more documents, particularly in the case of mobile devices.

Particularly, in a fixed layout document, for example, each character is represented by individual paths, so that, even for duplicated characters occurred repeatedly, they must be represented by separate paths, causing significant redundancy in a large amount of paths, and resulting to a large document volume accordingly. However, through generating font files, duplicated characters may be represented by only one font file, greatly reducing original path redundancy, which is thus beneficial to achieve reduced document volumes and solve the problem of document data redundancy.

In the above technical solution, preferably, the step 204 comprises: acquiring a minimum enclosing rectangle of each path primitive; detecting position relationships between the minimum enclosing rectangles of the various path primitives, wherein if two path primitives have their minimum enclosing rectangles intersected with each other or if a distance between the minimum enclosing rectangles of the two path primitives is less than a predetermined character spacing, the two path primitives are divided into the same path group. In other words, if a minimum enclosing rectangle corresponding to a path primitive intersects with a minimum enclosing rectangle corresponding to another path primitive, or if the distance between two path primitives is less than a predetermined character spacing, the two path primitives are divided into the same path group. In this solution, for each path primitive, its minimum enclosing rectangle is considered as an area corresponding to the path primitive, and through an interaction calculation or through a distance calculation performed on rectangular areas, it may be determined whether a path primitive will be divided into the same path group with other path primitives. Actually, each character corresponds to a path group (also, there may be other path groups that are not used to represent characters), and the division of each character of a fixed layout document may be achieved through the grouping process described above.

In the above technical solution, preferably, at step 206, the step of obtaining path groups representing characters comprises: recognizing each path group through an Optical Character Recognition (OCR) technique; if a character corresponding to a path group is recognized, it is determined that the corresponding path group is used to represent the character. In this solution, if a path group is used to represent a character, it may be recognized through an OCR technique, so that whether a path group is used to represent a character may be determined as described above.

In the above technical solution, preferably, after step 206, further comprises: recognizing a Unicode value corresponding to a path group that is used to represent a character; representing the character to be described with the recognized Unicode value and a corresponding font file. In this technical solution, a font file comprises path data for describing a character to facilitate proper document content reflowing on different devices and achieve better display effects. Through setting Unicode values, when a character of a document is selected by a user, the system may select a corresponding Unicode value to achieve character copy and the like.

In the above technical solution, preferably, the step of generating font files comprises: generating the font file using the recognized Unicode value and a corresponding path group. In this technical solution, the font file is generated from the Unicode value and the path group, so as to guarantee the appropriate representation of the corresponding character.

In the above technical solution, preferably, the step of generating font files using the Unicode values and corresponding path groups comprises: generating a first table using the Unicode values, in which mappings between the Unicode values and font indexes are stored; generating a second table using path primitives contained in the path groups, in which the font indexes and font data (or path data) corresponding to the font indexes are stored; generating the font file using the first table and the second table. In this technical solution, the first table is a cmap table generated using the Unicode values, and the second table is a glyf table that is generated using the path groups.

In the above technical solution, preferably, further comprises determining whether a recognized Unicode value has been recorded, wherein if the Unicode value has been recorded, it is determined that there is a path group representing the same character and the recorded Unicode value and its corresponding font file that has been generated are acquired to represent the character to be described; and if the Unicode value has not been recorded, a font file is generated to represent the character to be described. In this technical solution, through comparing the recognized Unicode value, it is determined whether a character that is presently processed has been handled, that is, whether there is the same character existed; if so, a font file that has been generated previously and other information may be directly used to avoid data redundancy; otherwise, a font file is generated. From the above comparison, it may be guaranteed that only one font file is generated from each character, so that data redundancy may be avoided so as to reduce the volume of the document.

In the above technical solution, preferably, further comprises: centrally storing the font files, and representing a corresponding character using the name of a font file and a Unicode value corresponding to the Unicode file, wherein if an acquired Unicode value of a specified path group has been recorded previously, coordinates of the specified path group are further acquired, and it is determined whether the coordinates of the specified path group are identical to those of the recorded path group, wherein if identical, a determination of the same path group is made and no further process is required; otherwise, a new name is generated to represent a corresponding character using the recorded Unicode value and generate a font file named with the new name. In this technical solution, through coordinate determination, for a character represented by a path group that is presently processed, it is determined whether there is any other path group representing the same character, so as to guarantee that only one font file and other information is generated for the same character so as to reduce the volume of the document as much as possible and avoid redundancy Below, with reference to FIGS. 3 to 7, a detailed description will be given to the process of fixed layout document format conversion based on the technical solution of the present invention.

Figure 3:
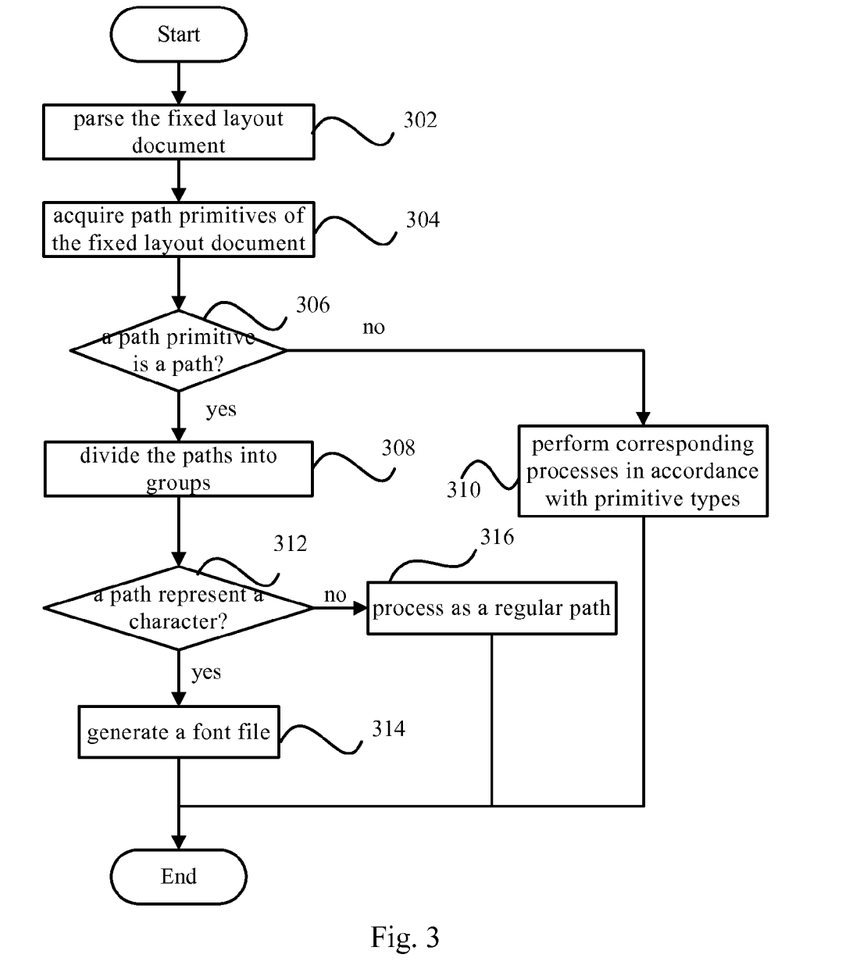
FIG. 3 shows a particular flowchart of converting a fixed layout document according to the embodiment of this invention.

First, an introduction of general steps will be given with reference to FIG. 3, wherein FIG. 3 shows a particular flowchart of converting a fixed layout document according to an embodiment of this invention.

As shown in FIG. 3, the particular flowchart of the process of converting a fixed layout document according to the embodiment of this invention comprises the following steps.

At step 302, the fixed layout document is parsed. Particularly, the original fixed layout document is parsed using a parsing engine.

At step 304, path primitives of the fixed layout document are acquired according to the parsing result.

At step 306, it is determined whether the path primitives are paths. Particularly, through parsing the data of the fixed layout document, primitive IDs, primitive types, primitive data, etc., may be acquired. Thus, through parsing the types of the primitives, it may be determined whether the primitives are paths. Wherein, if so, the process proceeds to step 308, otherwise, the process proceeds to step 310.

At step 308, the paths are divided into groups to obtain path groups, wherein each path group is used to represent a complete element, such as, a character.

At step 310, corresponding processes are performed in accordance with primitive types.

At step 312, it is determined whether a path represents a character, if so, the process proceeds to step 314; otherwise, the process proceeds to step 316.

At step 314, a font file is generated.

At step 316, it is processed as regular paths.

Figure 4:
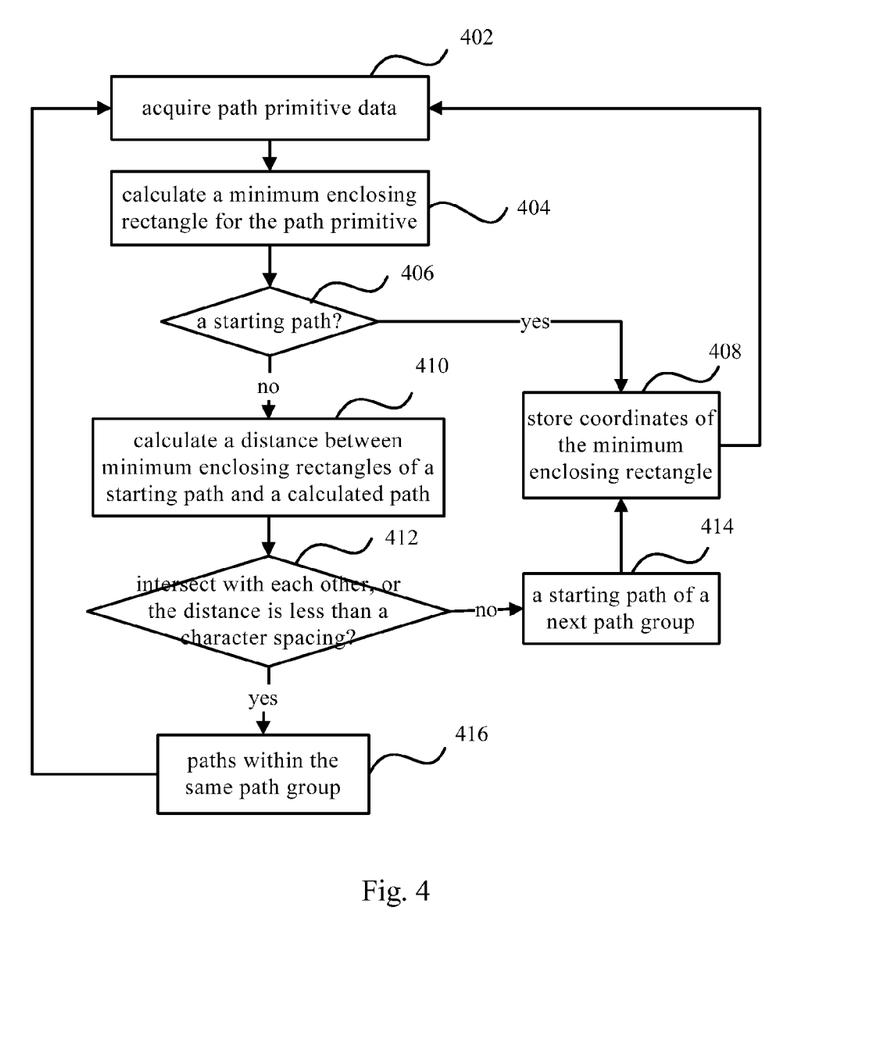
FIG. 4 shows a flowchart of dividing path primitives into groups according to the embodiment of this invention.

As to step 308, particularly, FIG. 4 shows a flowchart of dividing path primitives into groups according to an embodiment of this invention.

As shown in FIG. 4, the process of dividing path primitives into groups according to an embodiment of this invention comprises the following steps.

At step 402, path primitive data is acquired, i.e., a path primitive belonging to the path type.

At step 404, a minimum enclosing rectangle is calculated for the path primitive and is used as an area corresponding to the path primitive.

At step 406, it is determined whether a path primitive that is processed presently is a starting path, i.e., a first path of a path group; if so, the process proceeds to step 408; otherwise, the process proceeds to step 410. Particularly, a path primitive to be processed immediately following the completion of the grouping of a previous path group is used as a starting path.

At step 408, coordinates of the minimum enclosing rectangle are stored and the process returns to step 402.

At step 410, a distance between minimum enclosing rectangles of a starting path and a calculated path is calculated, to determine the relationship therebetween. Herein, the minimum enclosing rectangle of the calculated path is the coordinate data stored at step 408.

At step 412, according to the calculation result of step 410, it is determined whether the both intersect with each other, or if the both do not intersect with each other, whether the distance therebetween is less than a character spacing. Wherein, if they intersect with each other or if the distance is less than the character spacing (or another predetermined distance), the process proceeds to step 416; otherwise, the process proceeds to step 414.

At step 414, the path primitive is used as a starting path of a next path group, and the process proceeds to step 408.

At step 416, these paths are within the same path group.

Figure 5:
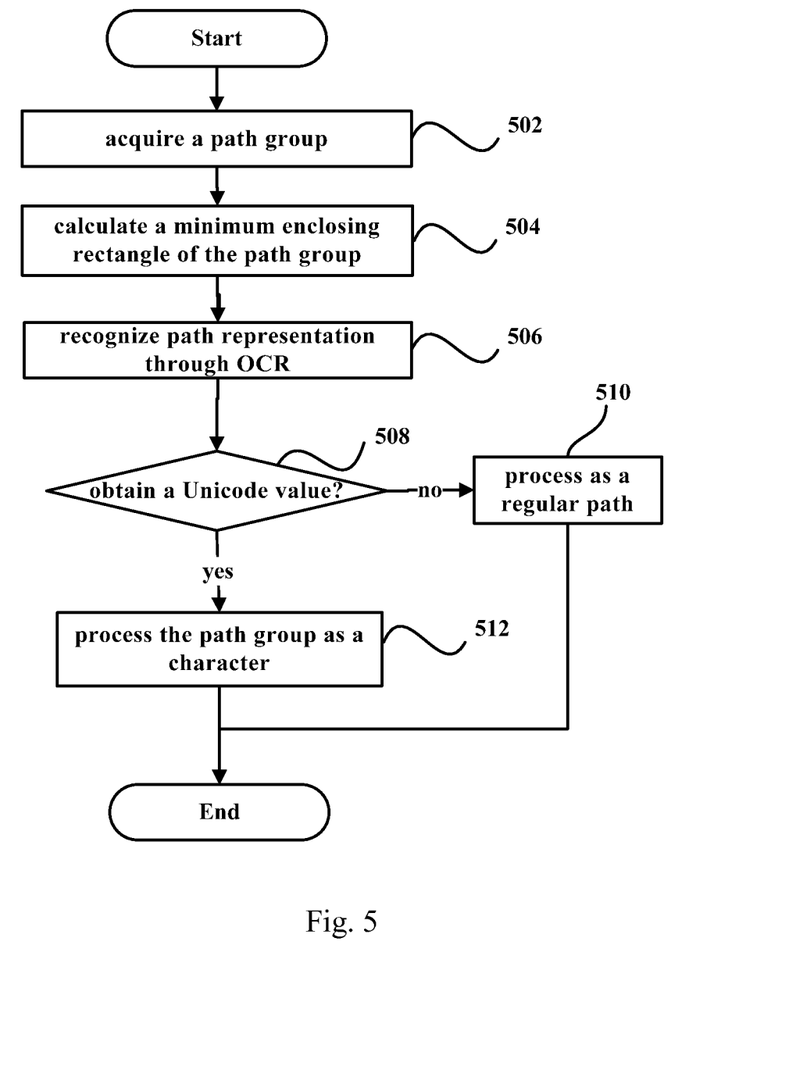
FIG. 5 shows a flowchart of determining whether a path primitive is used to represent a character according to the embodiment of this invention.

As to step 312, particularly, FIG. 5 shows a flowchart of determining whether a path group is used to represent a character according to the embodiment of this invention.

As shown in FIG. 5, the process of determining whether a path group is used to represent a character according to the embodiment of this invention comprises the following steps.

At step 502, a path group is acquired.

At step 504, a minimum enclosing rectangle of the path group is calculated as an area corresponding to the path group.

At step 506, a corresponding character is acquired through recognizing the path group using an OCR technique.

At step 508, it is determined whether a corresponding Unicode value may be recognized based on the recognized character; if so, the process proceeds to step 512; otherwise, it proceeds to step 510.

At step 510, the path group is processed as regular paths.

At step 512, the path group is processed as a character.

Step 312 further comprises determining whether two or more path groups represent the same character. Particularly, FIG. 6 shows a flowchart of determining whether path groups represent the same character and its corresponding processing method according to the embodiment of this invention.

Figure 6:
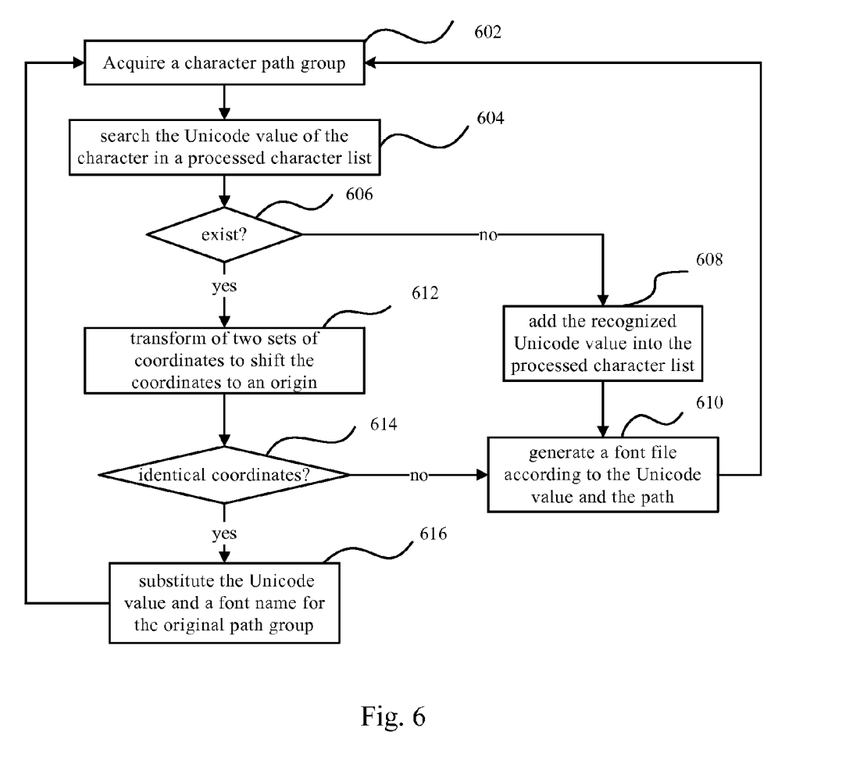
FIG. 6 shows a flowchart of determining whether a path primitive is used to represent a duplicated character and a corresponding processing method according to the embodiment of this invention.

As shown in FIG. 6, the process of determining whether path groups represent the same character and its corresponding processing method according to the embodiment of this invention comprises the following steps.

At step 602, a path group is acquired.

At step 604, a Unicode value of a character represented by the path group is recognized, and a processed character list is searched, wherein the processed character list is used to store Unicode values of characters represented by path groups that have been processed previously.

At step 606, based on the search result, it is determined whether the Unicode value of the character that is searching is within the processed character list. If so, the process proceeds to step 612; otherwise, it proceeds to step 608.

At step 608, it is indicated that the character represented by the present path group occurs in the fixed layout document for the first time, and the recognized Unicode value is added into the processed character list.

At step 610, a font file is generated according to the Unicode value and the paths, and the process returns to step 602 to continue with the process of other path groups.

At step 612, coordinates of the present path group and the founded path group are acquired, and the both sets of coordinates are transformed. Particularly, the coordinates may be shifted to an origin for comparison.

At step 614, it is determined whether the two sets of coordinates are identical, wherein, if so, the process proceeds to step 616; otherwise, it proceeds to step 610.

At step 616, it is indicated that they represent the same character, and the character is represented by substituting the stored Unicode value and a font name (an internal name of the font file) for the original path data; then the process returns to step 602 to continue with the process of other path groups.

Figure 7:
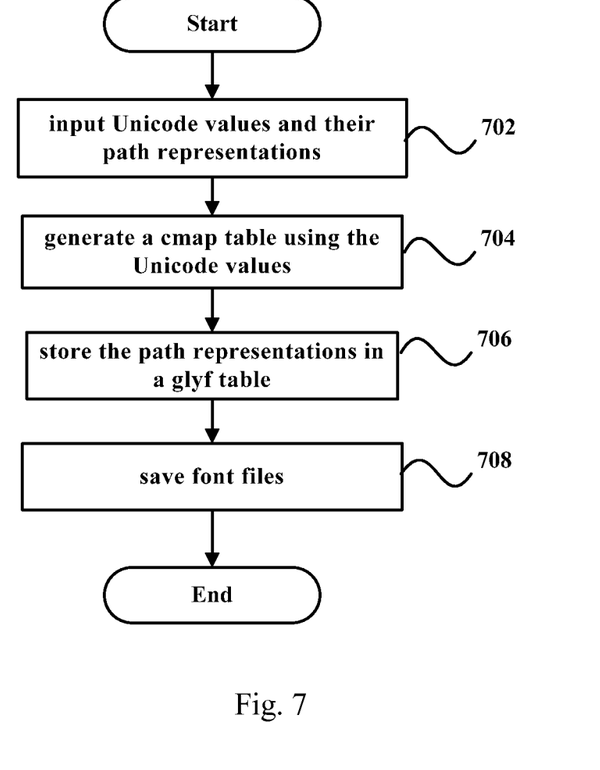
FIG. 7 shows a flowchart of generating font files according to the embodiment of this invention.

At step 314, particularly, FIG. 7; shows a flowchart of generating a font file according to the embodiment of this invention.

As shown in FIG. 7, the process of generating font files according to the embodiment of this invention comprises the following steps.

At step 702, Unicode values and their path representations (i.e., path groups corresponding to the Unicode values) are inputted.

At step 704, a cmap table is generated using the Unicode values.

At step 706, the path representations are stored in a glyf table. Certainly, other representation tables required by OpenType font files must be generated as well.

At step 708, corresponding OpenType font files are generated using the generated cmap table, the glyf table and the other representation tables, and the font files are stored.

One or more computer readable media having computer executable instructions contained therein are further provided in this disclosure, when executed on a computer, the instructions executing a digital right combination method, the method comprising: parsing a fixed layout document to acquire path primitives of the fixed layout document; dividing the path primitives into groups to generate path groups; acquiring path groups representing characters and generating font files corresponding to the path groups representing the characters, wherein if there are two or more path groups representing the same character, only one font file is generated, and is associated with the two or more path groups representing the same character; generating a converted document using all font files that have been generated.

A computer provided with one or more computer readable media having computer executable instructions contained therein is further provided in this disclosure, when executed by the computer, the instructions implementing the method of claim 9.

Exemplary Operating Environment

The computer or computing device as described herein comprises hardware, including one or more processors or processing units, system memory and some types of computer readable media. By way of example and not limitation, computer readable media comprise computer storage media and communication media. Computer storage media comprises volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Various embodiments of the invention may be described in a general context of computer executable instructions such as program modules executed on one or more computers or other devices. The computer-executable instructions may be organized into one or more computer-executable components or modules as software. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein. Aspects of the invention may also be practiced in distributed computing environments where tasks are performed by remote processing devices that are linked through a communications network. In a distributed computing environment, program modules may be located in both local and remote computer storage media including memory storage devices.

The technical solution of this invention has been described in detail above in connection with figures. In view of a large amount of data redundancy in fixed layout documents, an apparatus and a method for document format conversion is provided in this invention, capable of solving the problem of data redundancy in fixed layout documents to cause documents with smaller volumes, and capable of solving the problem of incorrect rendering in reflowing processes to achieve better display effects on various terminals.

What are described above are merely preferred embodiments of the present invention, but do not limit the protection scope of the present invention. Various modifications or variations can be made to this invention by persons skilled in the art. Any modifications, substitutions, and improvements within the scope and spirit of this invention should be encompassed in the protection scope of this invention.

What is claimed is:

1. An apparatus for document format conversion, comprising:

a document parsing unit configured to parse a fixed layout document containing many path primitives and acquire path primitives of the fixed layout document, wherein the fixed layout document is a document containing a predetermined layout of a plurality of characters and non-characters that are each fixed relative to each other in the document, wherein each of the characters and non-characters are defined by one or more of the many path primitives;

a path grouping unit configured to, in response to acquiring the path primitives, divide the path primitives into groups and to generate path groups which represent characters or non-characters;

a font file generating unit, the font file generating unit being configured to, in response to generating the path groups, acquire path groups representing characters and generating font files corresponding to the path groups representing characters, wherein if there are two or more path groups representing an identical character, only one font file is generated, and is associated with the two or more path groups representing the identical character;

a document generating unit configured to, in response to generating the font files, generate a converted document using all font files that have been generated, wherein the number of font files generated that represent the characters is less than the total number of path groups generated that represent the characters.

2. The apparatus for document format conversion according to claim 1, wherein the path grouping unit includes
an enclosing rectangle acquisition subunit configured to acquire a minimum enclosing rectangle of each path primitive, wherein in the case of a character defined by more than one path primitive, the minimum enclosing rectangle is smaller than an enclosing rectangle corresponding to the character defined by more than one path primitive;
a group processing subunit configured to detect position relationships between the minimum enclosing rectangles of the various path primitives; in the case of the minimum enclosing rectangles of two path primitives intersecting or in the case of a distance between the minimum enclosing rectangles of two path primitives being less than a predetermined character spacing, dividing the two path primitives into the same path group.

3. The apparatus for document format conversion according to claim 1, further comprising:
a representation determination unit configured to recognize each path group through an Optical Character Recognition (OCR) technique, wherein if a character corresponding to a path group is recognized, the corresponding path group is used to represent the character for the processing of the font file generation unit.

4. The apparatus for document format conversion according to claim 1, further comprising:
a Unicode recognition unit configured to recognize a Unicode value corresponding to a path group representing a character;
a character representation unit configured to represent a character to be described using the recognized Unicode value and the font file corresponding therewith.

5. The apparatus for document format conversion according to claim 4, wherein the font file generation unit is configured to generate the font file using the Unicode value recognized by the Unicode recognition unit and the path group corresponding therewith.

6. The apparatus for document format conversion according to claim 5, wherein the font file generation unit comprises:
a first table generation subunit configured to generate a first table using Unicode values and in which mappings between the Unicode values and font indexes are stored;
a second table generation subunit configured to generate a second table using path primitives contained in the path groups, in which the font indexes and font data corresponding to the font indexes are stored;
a table processing subunit configured to generate the font file using the first table and the second table.

7. The apparatus for document format conversion according to claim 5, further comprising:
a record state determination unit configured to determine whether a Unicode value recognized by the Unicode recognition unit has been recorded;
a data acquisition unit configured to determine, if the Unicode value has been recorded, that there is a path group representing the same character and acquiring the recorded Unicode value and the corresponding font file that has been generated, for representing the character to be described by the character representation unit; and
configured to generate, if the Unicode value has not been recorded, a font file for representing the character to be described by the character representation unit.

8. The apparatus for document format conversion according to claim 7, further comprising:
a file storage unit configured to store the font files for the character representation unit to represent a corresponding character using the name of a font file and a Unicode value corresponding to the Unicode file; and
a coordinate determination unit configured to further acquire, if an acquired Unicode value of a specified path group has been recorded previously, coordinates of the specified path group, and determine whether the coordinates of the specified path group are identical to those of the recorded path group; wherein
if identical, a determination of the same path group is made and no further process is required;
otherwise, a new name is generated for the character representation unit to represent a corresponding character using the recorded Unicode value and the new name and for the font file generating unit to generate a font file named with the new name.

9. The apparatus for document format conversion according to claim 1, wherein the font file generating unit is configured to generate, when it is determined that a Unicode value has not been recorded for a character, a new font file for representing the character.

10. A method for document format conversion, the method comprising:
parsing a fixed layout document containing many path primitives to acquire path primitives of the fixed layout document, wherein the fixed layout document is a document containing a predetermined layout of a plurality of characters and non-characters that are each fixed relative to each other in the document, wherein each of the characters and non-characters are defined by one or more of the many path primitives;
in response to acquiring the path primitives, dividing the path primitives into groups to generate path groups which represent characters or non-characters;
in response to generating the path groups, acquiring path groups that are used to represent characters and generating font files corresponding to the path groups that are used to represent characters, wherein if there are two or more path groups representing the same character, only one font file is generated and associated with the two or more path groups representing the same character; and
in response to generating the font files, generating a converted document using all font files that have been generated, wherein the number of font files generated that represent the characters is less than the total number of path groups generated that represent the characters.

11. The method for document format conversion according to claim 10, wherein the step of dividing the path primitives into groups to generate path groups further comprises the steps of:
acquiring a minimum enclosing rectangle of each path primitive, wherein in the case of a character defined by more than one path primitive, the minimum enclosing rectangle is smaller than an enclosing rectangle corresponding to the character defined by more than one path primitive; and
detecting position relationships between the minimum enclosing rectangles of the various path primitives, wherein in the case of the minimum enclosing rectangles of two path primitives intersecting or in the case of a distance between minimum enclosing rectangles of two path primitives being less than a predetermined character spacing, the two path primitives are divided into the same path group.

12. The method for document format conversion according to claim 10, wherein the step of acquiring path groups that are used to represent characters further comprises the step of:
recognizing each path group through an Optical Character Recognition (OCR) technique, wherein if a character corresponding to a path group is recognized, it is determined that the corresponding path group is used to represent the character.

13. The method for document format conversion according to claim 10, further comprising the steps of:
recognizing a Unicode value corresponding to a path group that is used to represent a character; and
representing a character to be described using the recognized Unicode value and a corresponding font file.

14. The method for document format conversion according to claim 13, wherein the step of generating font files further comprises:
generating the font files using the recognized Unicode values and a corresponding path groups.

15. The method for document format conversion according to claim 14, wherein the step of generating the font files using the recognized Unicode values and the corresponding path groups further comprises:
generating a first table using Unicode values, in which mappings between the Unicode values and font indexes are stored;
generating a second table using path primitives contained in the path groups, in which the font indexes and font data corresponding to the font indexes are stored; and
generating the font files using the first table and the second table.

16. The method for document format conversion according to claim 13, further comprising the steps of:
determining whether a Unicode value recognized by the Unicode recognition unit has been recorded; wherein,
if the Unicode value has been recorded, determining that there is a path group representing the same character and acquiring the recorded Unicode value and the corresponding font file that has been generated, for representing the character to be described; and
if the Unicode value has not been recorded, generating a font file for representing the character to be described.

17. The method for document format conversion according to claim 16, further comprising the steps of:
centrally storing the font files and representing the corresponding character using the name of the font file and the Unicode value corresponding to the Unicode file; wherein,
if the acquired Unicode value of the specified path group have been recorded previously, coordinates of the specified path group are further acquired, and it is determined whether the coordinates of the specified path group are identical to those of the recorded path group;
if identical, a determination of the same path group is made and no further process is required;
otherwise, a new name is generated and a corresponding character is represented using the recorded Unicode value and the new name and a font file named with the new name is generated.

18. One or more non-transitory computer readable media having computer executable instructions contained therein, when executed on a computer, the instructions executing a method for document format conversion, the method comprising:
parsing a fixed layout document containing many path primitives to acquire path primitives of the fixed layout document, wherein the fixed layout document is a document containing a predetermined layout of a plurality of characters and non-characters that are each fixed relative to each other in the document, wherein each of the characters and non-characters are defined by one or more of the many path primitives;
in response to acquiring the path primitives, dividing the path primitives into groups to generate path groups which represent characters or non-characters;
in response to generating the path groups, acquiring path groups representing characters and generating font files corresponding to the path groups representing the characters, wherein if there are two or more path groups representing the same character, only one font file is generated, and is associated with the two or more path groups representing the same character;
in response to generating the font files, generating a converted document using all font files that have been generated, wherein the number of font files generated that represent the characters is less than the total number of path groups generated that represent the characters.

* * * * *